United States Patent Office 3,232,704
Patented Feb. 1, 1966

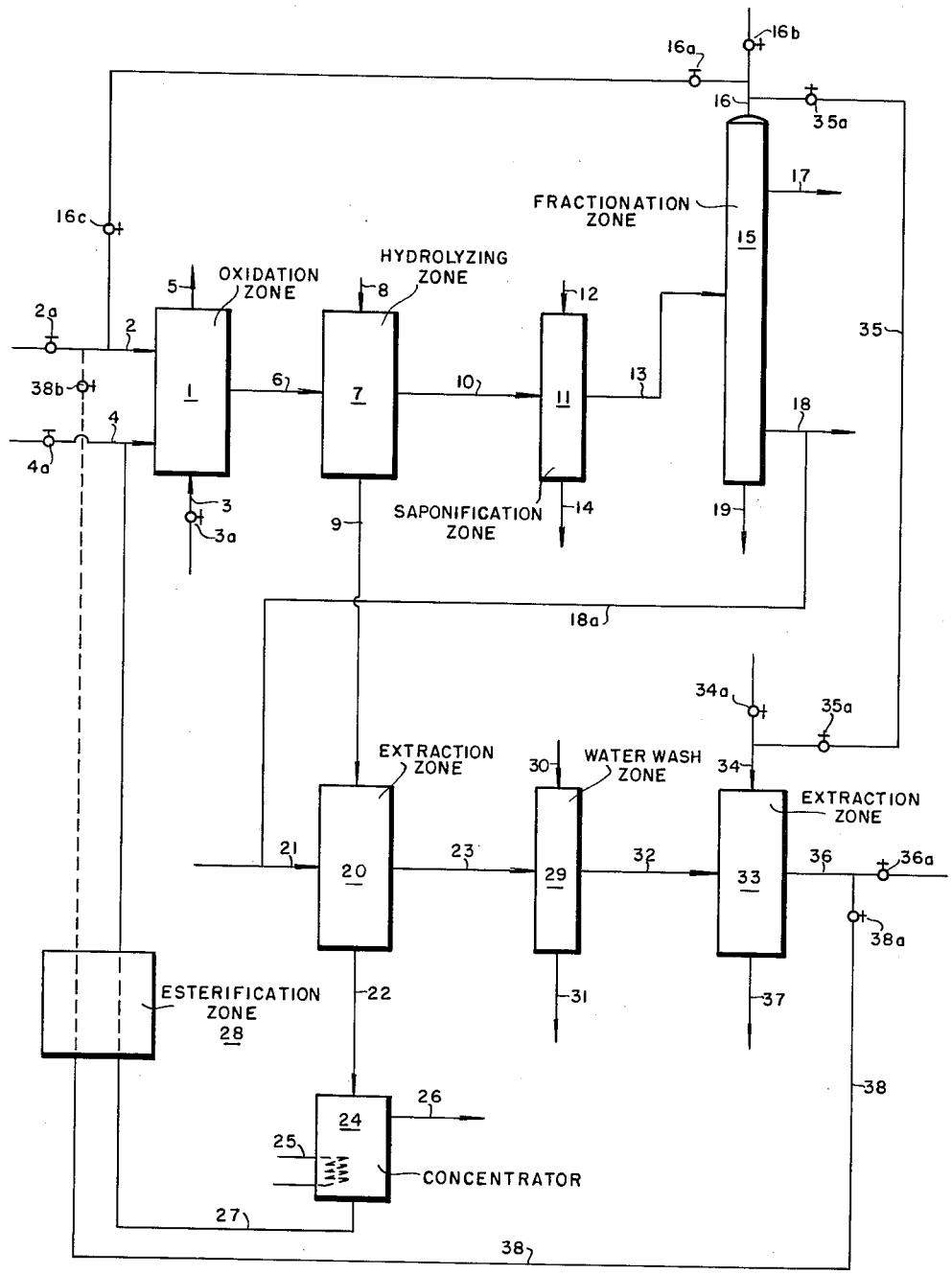

3,232,704
PROCESS FOR RECOVERING BORIC ACID
James E. Helbig, David O. Nelsen, Robert E. Pennington, and Isaac J. Satterfield, Baytown, Tex., assignors, by mesne assignments, to Esso Research and Engineering Company, Elizabeth, N.J., a corporation of Delaware
Filed Mar. 21, 1962, Ser. No. 181,307
7 Claims. (Cl. 23—149)

The present invention is directed to the oxidation of napthenes to the corresponding cyclic alcohols and ketones in the presence of a boric acid compound. More particularly the invention deals with the recovery of boric acid from the reaction products formed in the oxidation of naphthenes in the presence of a boric acid compound. In its more specific aspects, the invention is concerned with recovering substantially pure boric acid from the reaction products formed in the oxidation of naphthenes in the presence of a boric acid compound by water washing the oxidation reaction products and extracting the water wash aqueous phase with the corresponding cyclic alcohol of the naphthene oxidized.

The present invention may be briefly described as a method of extracting the aqueous phase of the water washed oxidation reaction products formed in the oxidation of naphthenes in the presence of a boric acid compound to recover substantially pure boric acid and recycling the boric acid for an effective process of oxidizing the naphthenes to the corresponding cyclic alcohols and ketones. Cyclic alcohols and ketones are prepared in accordance with the present invention by contacting a naphthene in liquid phase with molecular oxygen at a temperature within the range of about 100° C. to about 350° C. in the presence of a boric acid compound. The presence of the boric acid compound enhances the selectivity of the oxidation reaction to the desired cyclic alcohol and ketone. However, the desired result when using the boric acid compound is not fully appreciated economically unless the boric acid is recovered and fully utilized.

The present invention is further directed to the oxidation of naphthenes in the presence of a boric acid compound wherein all the materials in the system are fully utilized to obtain the greatest yield of the desired end product, i.e., the corresponding cyclic alcohol and ketone. It is readily apparent that in any chemical process involving chemical reactions that the process has little commercial value unless the desired reaction products can be easily recovered. The present invention deals with the recovery or recoveries of the desired products in the oxidation reaction of naphthenes in the presence of a boric acid compound. The present invention, when carried out in the preferred mode of operation, allows no impurities to be added to the system since the recoveries of the desired products are carried out with materials available in the system.

The naphthenes used in the present invention may be selected from the $C_3$ to $C_{20}$ cycloparaffins. Readily available naphthenes which may be utilized in the present invention are cyclohexane, cyclooctane and cyclododecane. Other naphthenes which may be used are, for example, cyclopentane, cycloheptane, cyclononane, cyclotetradecane, etc.

The naphthene starting material is oxidized in liquid phase with molecular oxygen in the presence of a boric acid compound. The source of molecular oxygen is preferably air. However, it is within the scope of the present invention to use purified molecular oxygen or molecular oxygen diluted to any desired extent with an inert gas such as nitrogen, methane, carbon dioxide, etc.

The term "boric acid compound," as used in the present invention, includes boric acid, metaboric acid, boric oxide, other boron-containing compounds which generate a boric acid upon contact with water, and boric acid derivatives such as the esters of boric acid or metaboric acid with an alkyl or aryl alcohol. Thus, the boric acid ester-type compounds may be an alkyl ester of orthoboric acid, an alkyl ester of metaboric acid, or an alicyclic ester of metaboric acid, for example, trimethylborate, triethylborate, tributylborate, triisobutylborate, trihexylborate, tridodecylborate, cyclopentylmetaborate, cyclohexylmetaborate, cycloheptylmetaborate, or mixed esters such as dimethylethylborate, and the like. In general, it is desired to provide at least a stoichiometrically equivalent amount of boric acid compound with respect to the naphthene to be oxidized (e.g., about 1 mol of boric acid for each 3 mols of naphthene to be oxidized). Accordingly, the amount of boric acid compound used may be within the range of about 0.05 to about 1.0 mol of boric acid compound per mol of naphthene to be oxidized. The prefererd range is within about 0.1 to about 0.5 mol of boric acid per mol of naphthene.

The oxidation reaction is conducted at a temperature within the range of about 100° C. to about 350° C. and at a pressure sufficient to maintain the naphthene in liquid phase. Therefore, suitable pressures are within the range of about 0 to about 1000 p.s.i.g. The oxidation reaction is preferably carried out at temperatures within the range of about 125° C. to about 250° C. and at pressures within the range of about 50 to about 500 p.s.i.g.

The oxidation of the naphthenes may be catalyzed by using a polyvalent, heavy metal catalyst. Effective as a catalyst in the oxidation reaction, are the soluble salts of the heavy metal such as cobalt, manganese, lead, iron, etc. The heavy metal is suitably added as the salts of an organic acid; such salts include by way of illustration the acetates, naphthenates, toluates, stearates, etc. Suitable catalyst compounds include cobalt naphthenate, cobalt acetate, manganese acetate, ferrous phthalocyanine, etc. The amount of catalyst may be such that the reaction mixture contains from about 1 to 1000 p.p.m. of solubilized polyvalent, heavy metal.

It has been discovered that in the oxidation of naphthenes where a boric acid compound is used, a high selectivity of the cyclic alcohol and ketone corresponding to the naphthene oxidized is obtained. It is considered that the boric acid compound reacts to form ester complexes when in the presence of the cyclic alcohol and ketone in the reaction products to retard further oxidation of the alcohol and ketone to undersirable oxidation products. The high selectivities to the desired product has been proven by the hydrolysis of the reaction mixture with a suitable hydrolyzing agent, preferably water, wherein a water phase containing boric acid and an oil phase containing high yields of cyclic ketone and alcohol are obtained.

According to the present invention it has been found that while boric acid and adipic acid (which comprises the bulk of the undesired oxidation products) have similar solubility characteristics in water and most organic solvents, they are surprisingly dissimilar in cyclic alcohols. Thus, for example, in the air oxidation of cyclohexane, a water wash of the oxidate (containing both boric acid and adipic acid) when extracted with cyclohexanol will reject adipic acid into the oil layer, leaving a water solution of practically pure boric acid. The water solution of boric acid may then be concentrated and dried whereby the boric acid alone may be used in the oxidation of naphthenes or the boric acid may be used as a coreactant to form the desired boric acid compound used in the oxidation.

The present invention is further directed to an oxidation process wherein all the products in the system are fully utilized. Accordingly, since the cyclic alcohol used in the recovery of the boric acid is a desired end product, the alcohol used in the extraction of the boric acid is recovered. The removal of the adipic acid and other oxidation impurities, including other organic acid, in the oil layer formed in the extraction of the boric acid cannot be accomplished by the conventional distillation or crystallization techniques due to fundamental difficulties in the separation. However, according to the present invention, the addition of an excess of naphthene to the oil layer recovered from the extraction of the boric acid results in a decrease in solubility of adipic acid and water in the oil layer and the acid is rejected as a water solution. The oil layer consists of the naphthene and the corresponding alcohol which may be recycled to an esterification zone to be reacted with metaboric acid, for example, to form the borate ester prior to recycling to the oxidation zone. Instead of esterifying the cyclic alcohol, a simple fractionation can be employed for separation of the naphthene from the cyclic alcohol and only the naphthene recycled for further oxidation.

The present invention will be further illustrated by reference to the drawing in which:

The sole figure is a flow diagram of a preferred mode wherein a single system is defined and all the components thereof are fully utilized to provide the greatest yield of the desired cyclic alcohol and ketone.

The liquid phase oxidation of the naphthene is carried out in an oxidation zone 1 which comprises a reaction vessel wherein the naphthene is introduced by line 2, controlled by the valve means 2a and molecular oxygen, preferably air, is introduced by line 3, controlled by valve means 3a. The oxidation is carried out in the presence of a boric acid compound, preferably the mono-ester of boric acid and the cyclic alcohol formed in the oxidation, introduced by line 4 and controlled by valve means 4a. The oxidation conditions are maintained in zone 1 whereby the excess air and low boiling oxidation products are recovered by line 5. The oxidation products which includes the boric acid ester complex formed in the presence of the cyclic alcohol and cyclic ketone are recovered by line 6. The oxidation products are then introduced to a hydrolyzing zone 7. Hydrolyzing zone 7, while depicted as a single zone may comprise, for example, two units. In hydrolyzing zone 7, the oxidation products are thoroughly mixed with water which is introduced by line 8, and a water phase and an oil phase are formed. The water phase is removed by line 9. The oil phase, which comprises the cyclic alcohol and cyclic ketone is removed by line 10 and then introduced into a saponification zone 11. In zone 11 an alkali metal hydroxide, such as sodium hydroxide, potassium hydroxide, or lithium hydroxide is added by line 12. The aqueous alkali metal hydroxide used has a caustic strength of at least three percent by weight. The hydroxide is added to saponify the organic esters formed with the cyclic alcohol in the oxidation. Accordingly, all the recoverable cyclic alcohol is obtained and is recovered by line 13. The undesirable organic acid salts are removed from the saponification zone 11 in the water phase by line 14. The cyclic alcohol and ketone are separated from the remaining oxidation products preferably by introducing it into a fractionation zone 15 such as a modern fractional distillation tower wherein the unreacted naphthene is recovered with the light ends by line 16, the cyclic ketone by line 17 and the cyclic alcohol by line 18. The heavy ends are removed from the fractionation zone 15 by line 19. The unreacted naphthene may be recycled by line 16 to be introduced through line 2 to the oxidation zone 1. The amount of recycle of the unreacted naphthene is controlled by valve means 16a, 16b and 16c which regulate the flow to zone 1 and discharge from the system, respectively.

The recovery of substantially pure boric acid is accomplished by introducing the water phase in line 9 to an extraction zone 20. Also introduced in zone 20 by line 21 is the cyclic alcohol corresponding to the naphthene oxidized. Preferably, the cyclic alcohol is a portion of the cyclic alcohol recovered by line 18 and is passed by line 18a to line 21 for introduction to extraction zone 20. The portion of alcohol used for the extraction may be controlled by valve means (not shown). The resulting mixture is agitated and a water phase and oil phase are formed and separated. The water phase is removed from extraction zone 20 by line 22 and the oil phase by line 23. The water phase containing substantially pure boric acid in line 22 is introduced into a concentrator 24 wherein the water is driven off by a heating means 25 and removed from the concentrator by line 26. The pure boric acid as a solid is recovered by line 27 which is a suitable conveyor for handling solids such as an endless belt. The boric acid may be recirculated by line 27 to line 4 for reintroduction to the oxidation zone 1. However, it is preferred that only a portion of the water be driven off in the concentrator 24 and the resulting slurry of boric acid be pumped through line 27 to an esterification zone 28. Thus, rather than using the boric acid per se, the ester-type compound is used and the recovered boric acid is passed to the esterification zone 28 to convert the boric acid to the ester-type compound utilized in the oxidation zone.

To fully utilize all the components in the recovery system of the present invention, the oil phase from the extraction zone 20 is introduced by line 23 to a water wash zone 29. The oil phase is thoroughly mixed with water introduced by line 30 and the resulting water and oil phases are separated. The water phase is removed from water wash zone 29 by line 31 and the resulting oil phase is introduced by line 32 to a second extraction zone 33. To the extraction zone 33 is added by line 34 a portion of the naphthene being oxidized. This naphthene may be that recovered from the fractionation zone 15 and may be transferred to the extraction zone 33 by line 35. The introduction to the extraction zone 33 may be controlled by valve means 34a and 35a. The extraction of the oil phase with the added naphthene will reject the organic acids in the water which is present and recovery of the added cyclic alcohol is possible since it remains in the oil phase. The addition of the naphthene reduces the solubility of its corresponding cyclic alcohol in water allowing the recovery of the cyclic alcohol and naphthene in the oil phase by line 36 and the removal of the water and organic acid as the water phase by line 37. The naphthene and cyclic alcohol may then be recycled by line 38 for introduction to the oxidation zone 1 by line 2. Control of the introduction of the naphthene and alcohol is made by valve means 36a, 38a and 38b. However, in the preferred embodiment, the mixture of naphthene and cyclic alcohol are introduced to the esterification zone 28 wherein the cyclic alcohol is utilized in the formation of the borate ester. By controlling the ratio of boric acid and the cyclic alcohol in the naphthene-alcohol mixture introduced to esterification zone 28 to about 1:1, the corresponding mono-ester of boric acid and the cyclic alcohol is formed. For example, in the oxidation of cyclohexane, the ester would be cyclohexyl-metaborate.

The invention will be further illustrated by the following specific examples which are given by way of illustration and not as limitations on the scope of the invention.

EXAMPLE I

Cyclohexane is oxidized in the presence of cyclohexylmetaborate at a temperature in the range of 140° C. to about 190° C. and at a pressure within the range of about 80 to about 300 p.s.i.g. in liquid phase with air. A fifteen (15) percent conversion based on cyclohexane, with an eighty-five (85) percent combined selectivity to cyclohexanol and cyclohexanone is obtained. The oxidation products are treated as set forth in the flow diagram of Table I hereinafter. The organic acids set forth in the flow diagram are based on adipic acid.

Again the organic acids as set forth are based on adipic acid. While the first step recovery of both organic and

Table I

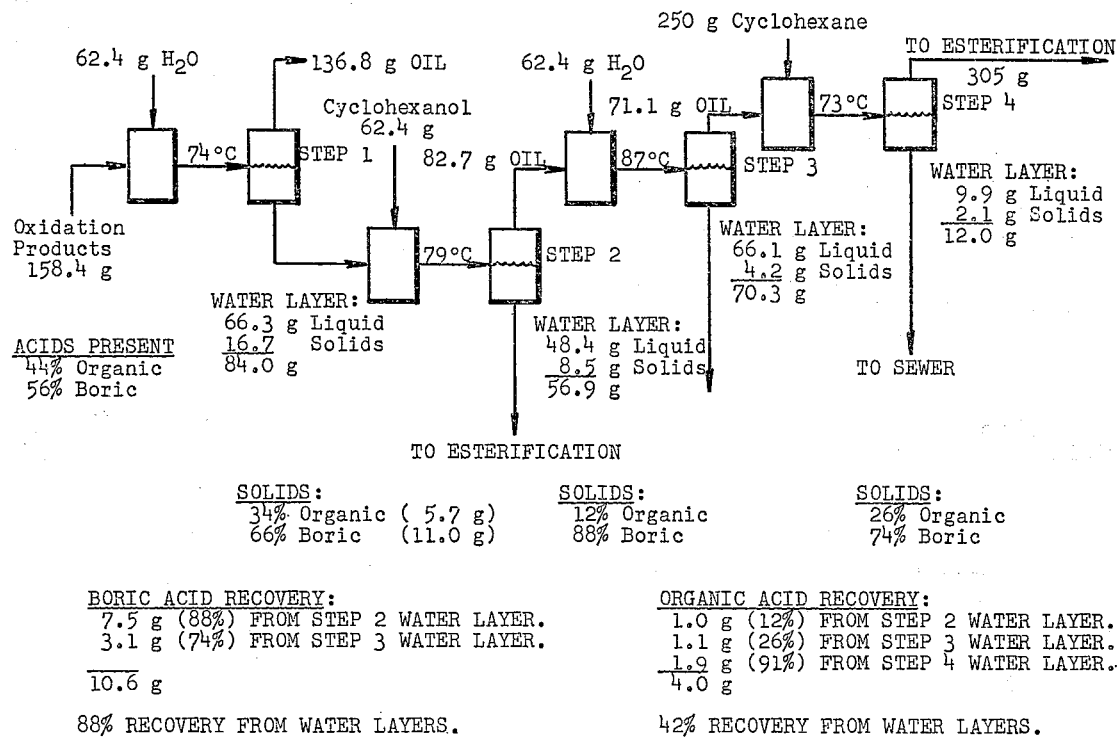

BORIC ACID RECOVERY:
7.5 g (88%) FROM STEP 2 WATER LAYER.
3.1 g (74%) FROM STEP 3 WATER LAYER.
_____
10.6 g

88% RECOVERY FROM WATER LAYERS.

ORGANIC ACID RECOVERY:
1.0 g (12%) FROM STEP 2 WATER LAYER.
1.1 g (26%) FROM STEP 3 WATER LAYER.
1.9 g (91%) FROM STEP 4 WATER LAYER.
_____
4.0 g

42% RECOVERY FROM WATER LAYERS.

EXAMPLE II

Cyclohexane is oxidized similarly as in Example I. The oxidation products are hydrolyzed in two steps as set forth in the flow diagram of Table II hereinafter.

boric acid is a little lower than in Table I, it is to be noted that the total recovery is greater when a two-step hydrolysis is carried out. The total boric acid recovery is greater than ninety (90) percent and approaches ninety-eight (98) percent recovery from the water layers.

Table II

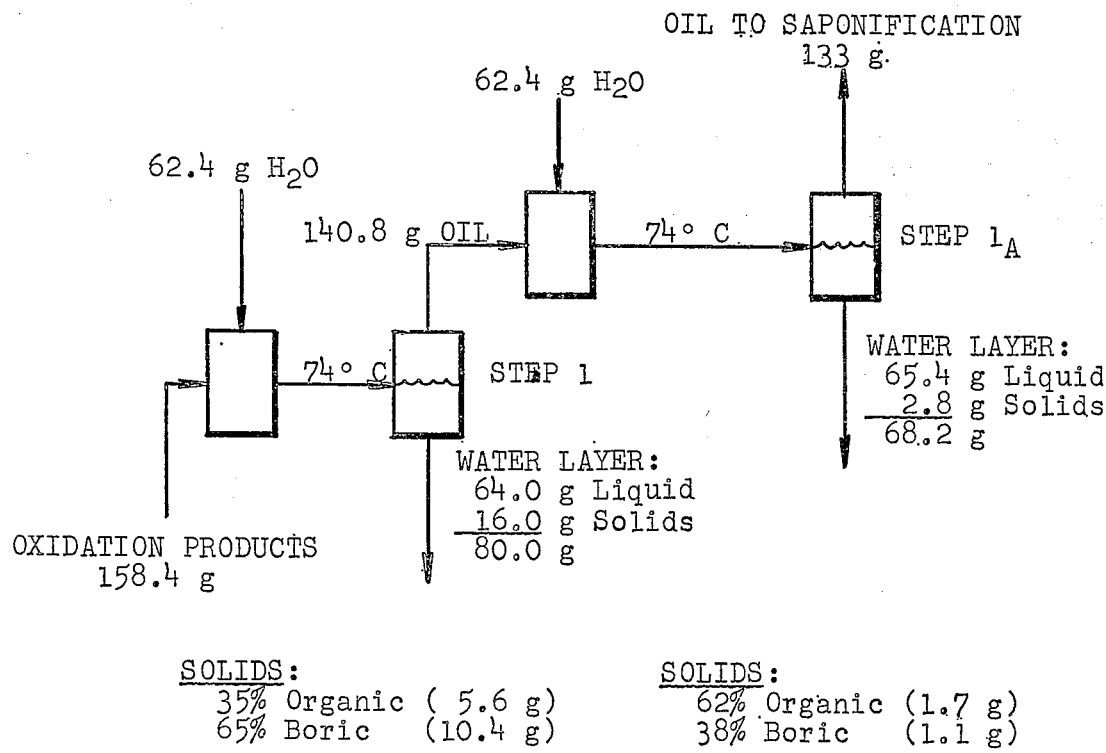

EXAMPLE III

Cyclooctane is oxidized in the presence of boric acid at a temperature in the range of 200° C. to about 300° C. and at a pressure within the range of about 50 to about 300 p.s.i.g. in liquid phase with air. The oxidation products are hydrolyzed with water and the water phase separated from the oil phase. The water phase is extracted with cyclooctanol whereby substantially pure boric acid is recovered in the water phase.

EXAMPLE IV

Cyclododecane is oxidized in the presence of cyclodecylmetaborate at a temperature in the range of 275° C. to about 400° C. and at a pressure within the range of about 10 to about 200 p.s.i.g. in liquid phase with air. The oxidation products are hydrolyzed with water and the water phase separated from the oil phase. The oil phase is water washed a second time and the water phase separated from the oil phase. The water phases are combined and extracted with cyclododecanol whereby substantially pure boric acid is recovered in the water phase. The oil phase containing the cyclododecanol is water washed and more boric acid is recovered in the water phase. The oil phase is then thoroughly mixed with cyclododecane wherein the degradation products which are mostly organic acids are rejected from the oil phase and removed in a water phase. The injected cyclododecane and recovered cyclododecanol are sent to an esterification zone wherein the cyclododecanol reacts with a portion of the recovered boric acid to form the cyclododecyl metaborate used in the oxidation.

The nature and objects of the present invention having been completely described and illustrated and the best mode thereof set forth, what we wish to claim as new and useful and secure by Letters Patent is:

1. A process for recovering boric acid from a mixture of reaction products formed in the oxidation of a naphthene with molecular oxygen at a temperature within the range of about 100° C. to about 350° C. in the presence of a compound selected from the group consisting of boric acid, metaboric acid, boric oxide, an alkyl ester of orthoboric acid, an alkyl ester of metaboric acid, and a cycloalkyl ester of metaboric acid which comprises hydrolyzing said reaction products whereby an aqueous phase and an oil phase are formed, separating said aqueous and oil phases, and extracting said aqueous phase with a cyclic alcohol corresponding to the naphthene oxidized whereby substantially pure boric acid is recovered from a second aqueous phase.

2. A method according to claim 1 wherein said naphthene oxidized is cyclohexane and said cyclic alcohol is cyclohexanol.

3. A process for recovering boric acid from a mixture of reaction products formed in the oxidation of a naphthene with molecular oxygen at a temperature within the range of about 100° C. to about 350° C. in the presence of a compound selected from the group consisting of boric acid, metaboric acid, boric oxide, an alkyl ester or orthoboric acid, an alkyl ester of metaboric acid and a cycloalkyl ester of metaboric acid which comprises hydrolyzing said reaction products whereby an aqueous phase and an oil phase are formed, separating said aqueous and oil phases, extracting said aqueous phase with a cyclic alcohol corresponding to the naphthene oxidized whereby substantially pure boric acid is recovered in the resulting aqueous phase, and concentrating said recovered boric acid whereby said boric acid may be further used in the oxidation of said naphthene.

4. A method according to claim 3 wherein said cyclic alcohol is a portion of the cyclic alcohol formed in the oxidation of said naphthene.

5. A process for recovering boric acid from a mixture of reaction products formed in the oxidation of a naphthene with molecular oxygen at a temperature within the range of about 100° C. to about 350° C. in the presence of a compound selected from the group consisting of boric acid, metaboric acid, boric oxide, an alkyl ester of orthoboric acid, an alkyl ester of metaboric acid, and a cycloalkyl ester of metaboric acid which comprises hydrolyzing said reaction products whereby an aqueous phase and an oil phase are formed, separating said aqueous and oil phases, recovering said cyclic alcohol and ketone from said oil phase, extracting said aqueous phase with a cyclic alcohol corresponding to the naphthene oxidized whereby substantially pure boric acid is recovered in a second aqueous phase and a second oil phase is formed, and water washing said second oil phase whereby additional boric acid is recovered.

6. A method according to claim 5 wherein said second oil phase is further extracted with the naphthene being oxidized whereby the cyclic alcohol is recovered.

7. A method according to claim 5 wherein said naphthene oxidized is cyclohexane and said cyclic alcohol is cyclohexanol.

References Cited by the Examiner

UNITED STATES PATENTS

| | | | |
|---|---|---|---|
| 1,931,501 | 10/1933 | Luther et al. | 260—617 |
| 2,833,623 | 5/1958 | May et al. | 23—149 |
| 2,938,924 | 3/1960 | Simon et al. | 260—586 |
| 3,011,871 | 12/1961 | May et al. | 23—149 |

OTHER REFERENCES

Bashkirov: Chem. Abstracts, vol. 51, p. 4027 (1957).

MAURICE A. BRINDISI, *Primary Examiner.*

LEON ZITVER, *Examiner.*